(12) United States Patent
Kassou et al.

(10) Patent No.: US 8,214,881 B2
(45) Date of Patent: Jul. 3, 2012

(54) SECURITY KEY WITH INSTRUCTIONS

(75) Inventors: Ahmad-Ramez Madjed Kassou, St. Petersburg (RU); Mikhail Leonidovich Kruchinin, St. Petersburg (RU); Maxim Nikolayevich Yazev, St. Petersburg (RU)

(73) Assignee: Siemens Aktiengesellschaft, München (DE)

( * ) Notice: Subject to any disclaimer, the term of this patent is extended or adjusted under 35 U.S.C. 154(b) by 397 days.

(21) Appl. No.: 11/660,642

(22) PCT Filed: Feb. 10, 2006

(86) PCT No.: PCT/RU2006/000054
§ 371 (c)(1),
(2), (4) Date: Dec. 18, 2008

(87) PCT Pub. No.: WO2007/094697
PCT Pub. Date: Aug. 23, 2007

(65) Prior Publication Data
US 2009/0125983 A1    May 14, 2009

(51) Int. Cl.
*G06F 7/04* (2006.01)
(52) U.S. Cl. ........... 726/3; 700/2; 700/17; 726/1; 726/4; 713/182; 713/185; 713/190; 709/217; 709/218; 709/219; 709/223
(58) Field of Classification Search .............. 726/1, 3–4; 700/2, 20, 17; 713/201, 182, 190, 185; 709/223, 709/217–219
See application file for complete search history.

(56) References Cited

U.S. PATENT DOCUMENTS

| | | | | |
|---|---|---|---|---|
| 6,640,140 | B1 * | 10/2003 | Lindner et al. | 700/18 |
| 6,687,704 | B1 * | 2/2004 | Russell | 1/1 |
| 6,766,454 | B1 * | 7/2004 | Riggins | 713/185 |
| 6,871,192 | B2 * | 3/2005 | Fontana et al. | 705/51 |
| 2002/0068983 | A1 | 6/2002 | Sexton | |
| 2004/0015383 | A1 | 1/2004 | Rathjen et al. | |
| 2004/0162996 | A1 * | 8/2004 | Wallace et al. | 713/201 |
| 2005/0122232 | A1 | 6/2005 | DeGroot | |

FOREIGN PATENT DOCUMENTS

| | | |
|---|---|---|
| DE | 199 61 920 A1 | 7/2001 |
| WO | WO 03/029907 A1 | 4/2003 |
| WO | WO 2004/042479 A2 | 5/2004 |

OTHER PUBLICATIONS

Samaras, I.K.; Gialelis, J.V.; Hassapis, G.D.; Akpan, V.A.; Utilizing semantic Web Services in factory automation towards integrating resource constrained devices into enterprise information systems, Emerging Technologies & Factory Automation, 2009, ETFA 2009, IEEE Conference on Issue Date: Sep. 22-25, 2009;on pp. 1-8.*
Nordell, D.E.; Transmission and Distribution Conference and Exposition, 2008. T&D. IEEE/PES Issue Date: Apr. 21-24, 2008 on pp. 1-14.*

* cited by examiner

*Primary Examiner* — Thanhnga B Truong
*Assistant Examiner* — Angela Holmes

(57) ABSTRACT

There is described an automation system comprising at least one programmable logic controller with integrated web server, user interface means, and security means. It is configured to allow a complex and flexible presentation of data at the user interface means while reducing the communication load at the same time. For this purpose, the instructions for presentation of the data are stored within the security means.

11 Claims, 2 Drawing Sheets

SECURITY KEY WITH INSTRUCTIONS

CROSS REFERENCE TO RELATED APPLICATIONS

This application is the US National Stage of International Application No. PCT/RU2006/000054, filed Oct. 2, 2006 and claims the benefit thereof. The International Application is incorporated by reference herein in its entirety.

FIELD OF INVENTION

The present invention relates to the field of industrial automation. The present invention relates also to an automation system comprising at least one programmable logic controller (PLC) with integrated web server, user interface means, and security means with integrated instructions.

BACKGROUND OF INVENTION

Existing PLC with integrated web server send two types of information to a remote location: data and instructions for presentation of this data at the remote location. The data may change during every scan cycle of the PLC, while the instructions are usually changed only if the PLC project is updated. Therefore, the instructions are updated much less frequently than the data changes. However, the PLC sends both data and instructions in response to every data request from the remote location. This results in significant duplication of communication load.

With development of remote interaction features, complexity of data presentation and, therefore, the amount of instructions for data presentation will grow. It will be critical soon to minimize the communication load and required storage space in PLC for presentation instructions.

Additionally, operation with PLC remotely through the Internet requires special security means to protect PLC control functions against non-authorized access. But also intranet scenarios require better security.

Also, different users at remote locations may want to have different customized web pages for interaction with the same PLC. It may be also desirable to provide users having different access right with different designs of web pages.

U.S. Pat. No. 6,640,140 discloses a PLC that contains web pages comprising data and associated instructions retrievable and executable by the remotely located computer. Thus, the PLC contains not only data retrievable by the remotely located computer, but rather in response to a request for data the web server, which is hosted by the programmable logic controller device, provides one or more web pages in which the requested data are displayed. U.S. Pat. No. 6,640,140 further discloses a method wherein the step of storing web pages comprising data and associated instructions retrievable and executable by the remotely located computer is performed according to instructions hosted by the same programmable logic controller device. Furthermore, the step of responding to a request for data from the remotely located computer by providing one or more of the web pages used to display the requested data is performed according to instructions hosted by the same programmable logic controller device.

SUMMARY OF INVENTION

It is an object of the present invention to allow a flexible presentation of data at the user interface means while reducing the communication load at the same time.

To perform this task the present invention discloses an automation system, comprising: at least one programmable logic controller, user interface means, and security means, with the PLC comprising an integrated web server, the web server providing data to be presented with the user interface means, the web server containing means for sending this data to the user interface means in response to data requests from the user interface means, the security means providing authentication means, the security means storing instructions for presentation of the data with the user interface means.

Storing of instructions at the security means instead of storing them in the PLC resolves the problems of duplication of communication load and allowing more complex and more flexible presentation of data at the user interface means. The authentication means can be used for any kind of connection: direct connection to the PLC, through intranet or Internet.

Advantageously, the instructions for presentation of the data comprise a web page template and an applet for filling in the web page template with the data, wherein the applet is downloadable from the security means and executable by the user interface means. This way, the web page can be opened with a standard web browser, while the applet, or script, initiates a data request to the PLC. The linking applet completes the web page templates with the received data and provides the browser with a completed web page.

Advantageously, the user interface means and the security means are located at a remote location. From this remote location a user can utilise the PLC from a PC through, for example, Internet via an appropriate communication network.

Advantageously, the security means comprise a hardware security device. This could be an USB-stick or a memory flash card in particular.

Advantageously, the security means comprise a software security key. This could be any kind of electronic key that, needless to say, can favourably be combined with a hardware security device.

Advantageously, the programmable logic controller comprises a description of data retrievable by the user interface means. That is, for example, XML. Using data description allows user at remote location to customize the appearance of their web pages provided the variables names are kept the same. Data description also can be used for direct data retrieval from the PLC with other applications at remote location.

Advantageously, this description includes a symbolic name, a physical address and/or a type of at least one variable. A set of variables is associated with each web page; however the data description does not include any information about the format of data representation at the remote location.

Advantageously, the instructions for presentation of the data are user specific. Thus, users can have different customized web pages for interaction with the same PLC.

Advantageously, the authentication means provide user specific access rights. This allows providing users having different access rights with different designs of web pages.

Advantageously, the security means are arranged within a mobile phone. In this case the mobile phone can exchange data with the computer by using any standard means like an IR-port or Bluetooth. Any suitable standard protocol can of course be used for data transfer.

Advantageously, the programmable logic controller comprises means for identification of changing respective programmable controller project that may require changes in corresponding instructions for presentation of the data. Such identification means analyses the information exchange between the PLC and engineering tools according to a certain protocol, e.g. S7.

Advantageously, the security means comprise read-only portion of storage for authorization information and read-write portion for storing the instructions for presentation of the data. This provides better integrity of the security key.

Advantageously, the automation system further comprises an administrator server separated from the programmable logic controller for administrating and assigning of the security means. When a new user is registered in the system he signs up for a security key at the administrator server and receives it along with web page templates and linking applet. According to the access rights of the user at the remote location the administrator server can provide the remote location with different web page templates. Further, the administrator server identifies the requesting user at the remote location by his security key and, if necessary, provides him with an updated version of web page templates and description of PLC data. The security key is used both for accessing the PLC and for accessing the administrator server database when receiving updated versions of web page templates.

Advantageously, the programmable logic controller comprises means for storing a log file for all events of access by the respective user identified with the security key and reporting it to the administrator server. This will provide the administrator server with information about events of direct connection to the programmable logic controller and enables it to monitor activities of particular users.

BRIEF DESCRIPTION OF THE DRAWINGS

In the following, the invention is described and exemplified in detail with the preferred embodiment shown in the figures, in which.

DETAILED DESCRIPTION OF INVENTION

Figure 1:
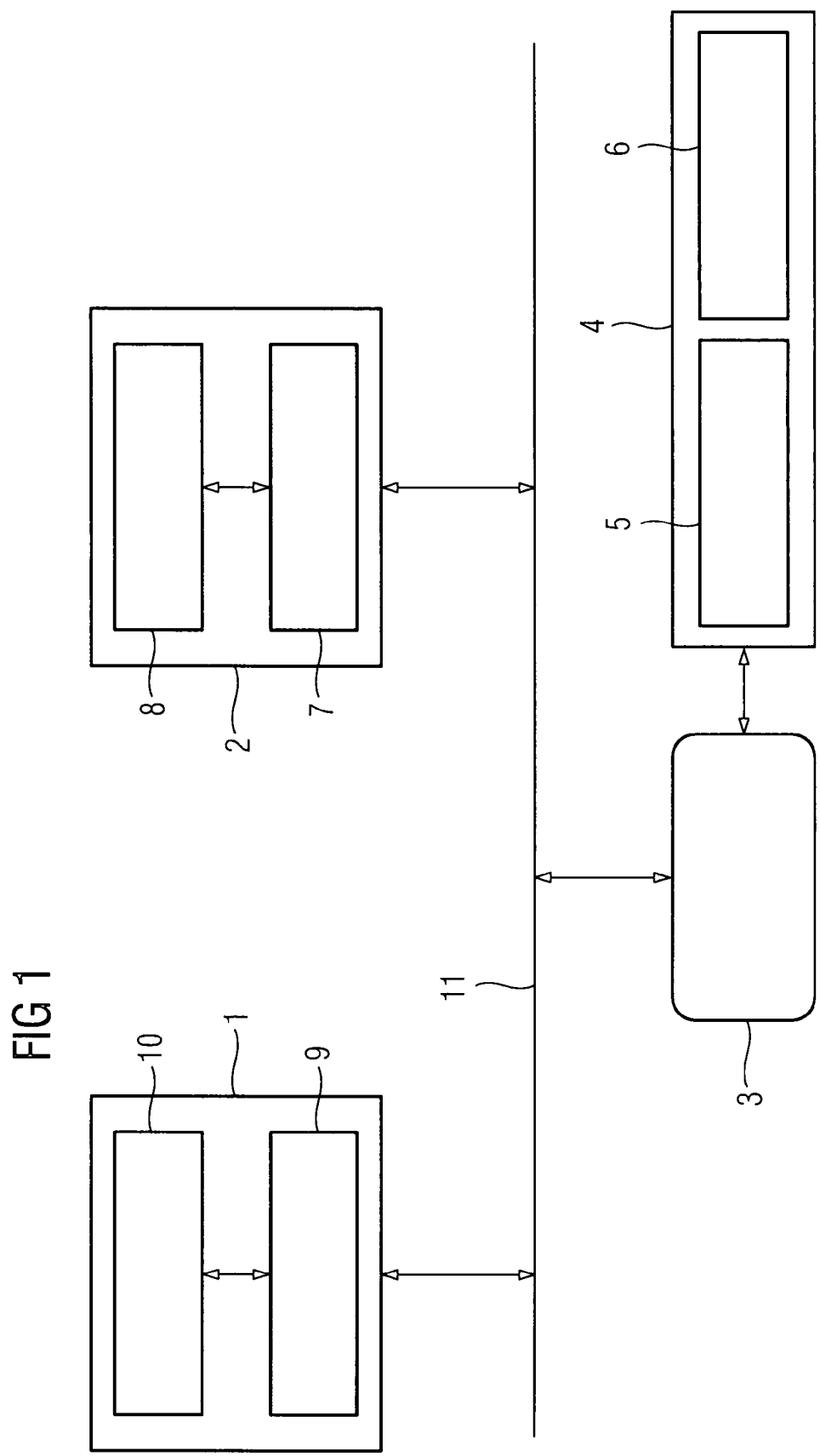
FIG. 1 is a block diagram showing an automation system comprising a PLC, a user interface and security means, and an administrator server as well.

Referring to FIG. 1, the PLC 1 comprises a web server 9 for sending data 10 (without instructions, i.e. no web pages and no applets) in response to data requests from the user interface means 3, e.g. a browser, at a remote location. A user at the remote location 3 utilizes security means 4 either in form of hardware (e.g. an USB stick or a memory flash card) or in form of software (electronic key). The security means comprise web page templates 5 for presentation of PLC data 10 and a linking applet 6. The linking applet 6 is downloaded from the security means 4 and executed at the user interface means 3 to fill in the web page template 5 with the data 10 received from the PLC 1 in response to the data request from the remote location 3.

The system operates in the following order: a) To begin the session with the PLC 1 the user plugs in the security key 4 and opens a web page from the web page templates 5, stored on the security key 4, with a standard web browser 3. b) The web page incorporates an applet or scripts 6, which initiates a data request to the PLC 1. c) The web server 9 at the PLC 1 processes the request from the user interface means 3 and sends the requested data 10 back to the remote location 3. d) The linking applet 6 completes the web page with the received data 10 and provides the browser at the remote location 3 with a completed web page.

When a new user is registered in the system he signs up for a security key 4 at the administrator server 2 and receives it along with web page templates 5 and linking applet 6. The security key 4 can be used for any kind of connection: direct connection to the PLC 1, through intranet or Internet, via an appropriate communication network 11. According to the access rights of the user of the user interface means 3 the administrator server 2 can provide the user at the remote location 3 with different web page templates 5. To this end the administrator server 2 contains a database of web page templates 8 and a web server 7 for communication purposes.

Figure 2:
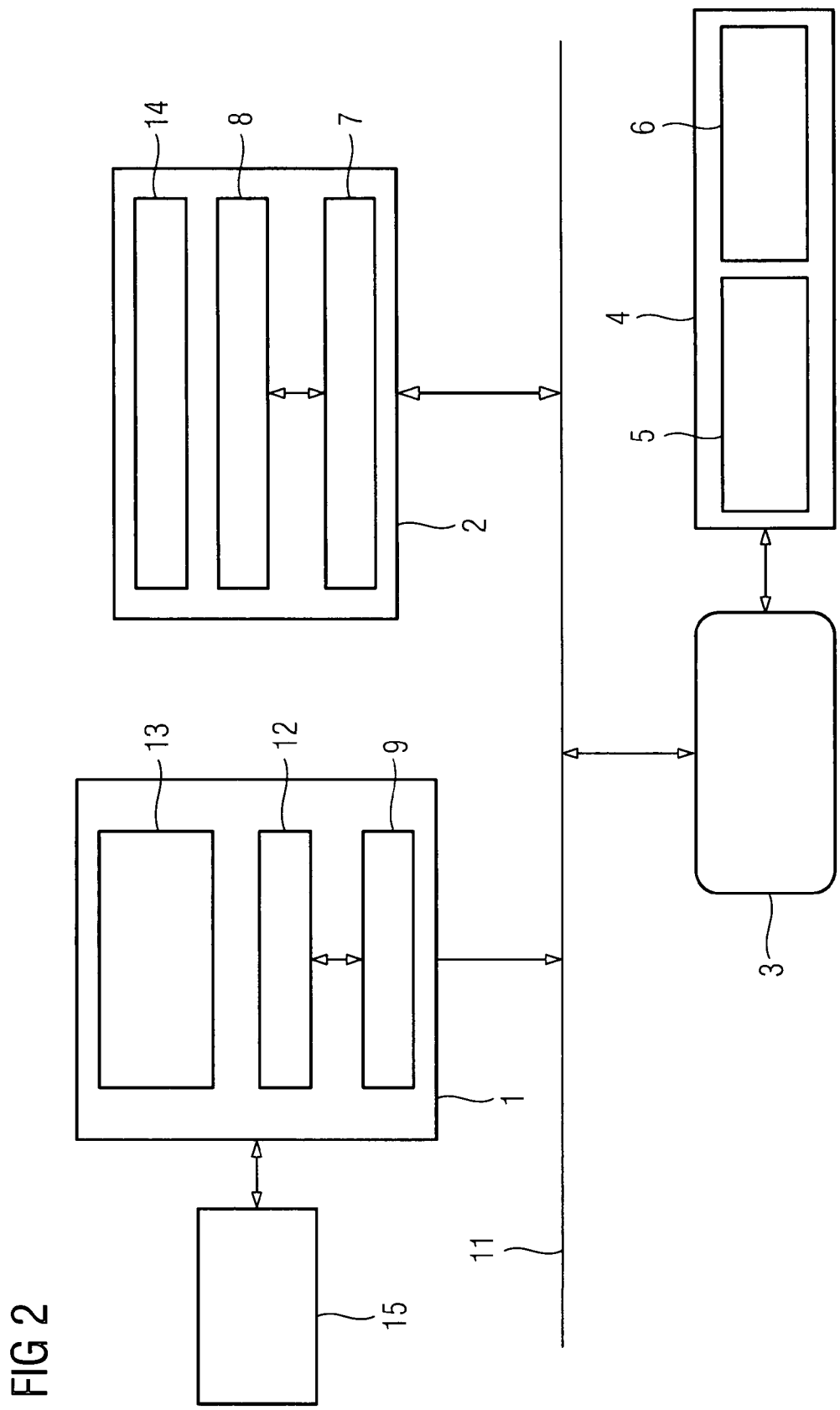
FIG. 2 is a block diagram showing the automation system of FIG. 1 with additional engineering tools.

Referring now to FIG. 2, the PLC 1 comprises a description of data 12 retrievable by the user interface means 3 at the remote location, e.g. XML. This description 12 includes, for example, a symbolic name of a variable, its physical address, and its type. The PLC 1 also comprises a means for identification of project changes 13 that may require changes in the corresponding web pages. Such identification means 13 analyses the information exchange between the PLC 1 and engineering tools 15 according to a certain protocol, e.g. S7.

When the changes of PLC content is identified, said identification means 13 requests the user, who is updating the PLC project, to provide new description of data 12 retrievable by the remote location 3 and automatically sends this new data structure to the administrator server 2. The administrator server 2 compares the received new data structure with the previous data structure stored in the database of data description 14 and in case they are different requests the user to provide an updated web page template to the administrator server 2. Then the updated web page template is stored in the database of web page templates 8.

PLC 1 and administrator server 2 can communicate via a communication network 11 either through the Internet (if the administrator server 2 is outside the factory, for example) or through other channels (e.g. a factory floor network). When a user at the remote location 3 accesses the PLC 1 through a communication channel (network or direct connection), the browser 3 includes in its data request the version of the current web page template 5 on the security key 4. If the version of the current web page template 5 does not comply with the version of the latest update, the PLC 1 redirects the remote location 3 to the administrator server 2 for downloading an updated web page template from the database 8 to the security key 4. The administrator server 2 identifies a requesting user at a remote location 3 by his security key 4 and provides the remote location 3 with an updated version of web page templates and with a description of the PLC data from its databases 8, 14. This description of PLC data is used at the user interface means 3 for formation of data requests.

Storing instructions at the security key 4 allows operation either through Internet, intranet without connection to the Internet or through direct connection. Interaction with the administrator server 2 is necessary only to update web page templates 5 in case the PLC content was changed. As a variation, the administrator server 2 can broadcast new versions of web page templates, e.g. via e-mail, to the users.

To provide better integrity of the security key 4 it can comprise a read-only portion of storage for the authorization information and a read-write portion for storing the web page templates 5 and the linking applet 6. The web page templates sent from the administrator server 2 to the remote location 3 may also depend on user rights linked to the specific security key 4.

Recapitulatory, the invention relates particularly to an automation system comprising at least one programmable logic controller (PLC) with integrated web server, user interface means, and security means. It is an object of the present invention to allow a complex and flexible presentation of data at the user interface means while reducing the communication load at the same time. For this purpose, the instructions for presentation of the data are stored within the security means.

What is claimed is:

1. An automation system, comprising:
a programmable logic controller having an integrated web server;
a user interface that presents data provided by the web server, wherein the data are requested by the user interface from the programmable logic controller, and wherein the programmable logic controller transmits the data to the user interface; and
a security device for an authentication,
wherein the programmable logic controller identifies a change of a respective programmable controller project that requires changes in corresponding instructions for the presentation of the data,
wherein the programmable logic controller stores a log file for all events of access by a respective user identified with the security key and reporting it to the administrator server,
wherein the security device stores instructions for a presentation of the data received from the programmable logic controller at the user interface,
wherein the instructions comprise a web page template and an applet for filling in the web page template with the data, wherein the applet is downloaded from the security device and executed by the user interface.

2. The automation system as claimed in claim 1, wherein the user interface and the security device are located at a remote location.

3. The automation system as claimed in claim 1, wherein the security device comprises a hardware device.

4. The automation system as claimed in claim 1, wherein the security device comprises a software security key.

5. The automation system as claimed in claim 1, wherein the programmable logic controller comprises a description of data retrievable by the user interface.

6. The automation system as claimed in claim 1, wherein the instructions for presentation of the data are user specific.

7. The automation system as claimed in claim 1, wherein the authentication device provides user specific access rights.

8. The automation system as claimed in claim 1, wherein the security device is arranged within a mobile phone.

9. The automation system as claimed in claim 1, wherein the security device comprises a read-only portion in a storage device for authorization information and a read-write portion in the storage to store the instructions for the presentation of the data.

10. The automation system as claimed in claim 1, further comprising:
an administrator server separated from the programmable logic controller for administrating and assigning the security device.

11. The automation system as claimed in claim 5, wherein the description includes a symbolic name or a physical address.

* * * * *